US006946976B1

(12) United States Patent
Langner et al.

(10) Patent No.: US 6,946,976 B1
(45) Date of Patent: Sep. 20, 2005

(54) COCKPIT DISPLAY SYSTEMS AND METHODS OF PRESENTING DATA ON COCKPIT DISPLAYS

(75) Inventors: Dale R. Langner, Olathe, KS (US); Philip I. Straub, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 10/086,598

(22) Filed: Feb. 28, 2002

(51) Int. Cl.[7] ............................................. G01C 21/00
(52) U.S. Cl. ......................... 340/971; 340/945; 701/14
(58) Field of Search ................................ 340/971, 973, 340/974, 975, 945; 701/3, 14

(56) References Cited

U.S. PATENT DOCUMENTS

| | | | | |
|---|---|---|---|---|
| 4,598,292 | A | * | 7/1986 | Devino ........................ 340/973 |
| 4,651,282 | A | | 3/1987 | Robinson et al. ........... 364/443 |
| 4,845,495 | A | * | 7/1989 | Bollard et al. .............. 340/973 |
| 5,475,594 | A | * | 12/1995 | Oder et al. .................. 340/971 |
| 5,808,563 | A | * | 9/1998 | Ching et al. ................ 340/976 |
| 6,057,786 | A | * | 5/2000 | Briffe et al. ................ 340/975 |
| 6,112,141 | A | | 8/2000 | Briffe et al. .................. 701/14 |
| 6,236,913 | B1 | * | 5/2001 | Bomans et al. ................ 701/3 |
| 6,275,172 | B1 | * | 8/2001 | Curtis et al. ................ 340/961 |
| 6,279,017 | B1 | | 8/2001 | Walker ........................ 707/529 |
| 6,285,298 | B1 | * | 9/2001 | Gordon ....................... 340/945 |
| 6,314,343 | B1 | | 11/2001 | Adams et al. ................. 701/3 |
| 6,346,892 | B1 | * | 2/2002 | DeMers et al. ............. 340/945 |
| 6,381,519 | B1 | * | 4/2002 | Snyder .......................... 701/3 |
| 6,449,556 | B1 | * | 9/2002 | Pauly .......................... 701/206 |
| 6,696,980 | B1 | * | 2/2004 | Langner et al. ............. 340/971 |

OTHER PUBLICATIONS

"Manual: Pilot's Guide— RMS 555 Bendix/King Radio Management System", *AlliedSignal Aerospace*, Copyright 1993, AlliedSignal, Inc., Olathe, KS,(Mar. 1, 1993),52 pages.

* cited by examiner

Primary Examiner—Brent A. Swarthout
(74) Attorney, Agent, or Firm—Devon A. Rolf

(57) ABSTRACT

Systems and methods for cockpit display systems are provided. A cockpit display is segmented into a first and a second region, within the first region flight setting data are presented including communication settings and navigational settings. The second region of the display presents additional settings and graphical data. Moreover, the display is encompassed by a bezel having flight controls and flight sensors integrated in close proximity to the bezel.

23 Claims, 4 Drawing Sheets

COCKPIT DISPLAY SYSTEMS AND METHODS OF PRESENTING DATA ON COCKPIT DISPLAYS

CROSS-REFERENCE TO RELATED APPLICATIONS

This application is related to the following commonly assigned U.S. patent applications: "Cockpit Instrument Panel Systems and Methods of Presenting Cockpit Data," Ser. No. 10/086,951; "Cockpit Control Systems and Methods of Controlling Data on Multiple Cockpit Instrument Panels," Ser. No. 10/086,929; "Cockpit Instrument Panel Systems and Methods with Redundant Critical Flight Data Display," Ser. No. 10/086,783; "Cockpit Instrument Panel Systems and Methods with Variable Perspective Flight Display," Ser. No. 10/086,573; "Customizable Cockpit Display Systems and Methods of Customizing the Presentation of Cockpit Data," Ser. No. 10/086,996, each of which is by the same inventors and of which the disclosure is herein incorporated by reference in its entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the screen layouts, and data as described below and in the drawings hereto: Copyright © 2002, Garmin Corporation, All Rights Reserved.

FIELD OF THE INVENTION

The present invention relates generally to cockpit display systems and methods of presenting data on cockpit displays. In particular, the present invention is directed to displaying flight data in a single location within a cockpit display.

BACKGROUND OF THE INVENTION

Modern commercial/private aircraft, as well as older aircraft, include a myriad of instrumentation panels having controls and displays used to present information related to the controls. The controls and the displays are operated, viewed, and interpreted by a pilot/copilot during flight of an aircraft. Some of these controls are used for assisting the pilot/copilot with navigation, such as an altimeter, an airspeed indicator, a horizontal situation indicator, an attitude indicator, and the like. Other controls are used to permit radio communication with other pilots in the air or with air traffic controllers during flight. Still more controls, in recent years, are used to assist in navigation using Global Positioning Satellite (GPS) systems associated with satellite technology. Furthermore, transponder controls permit the aircraft to be uniquely identified and the aircraft's altitude/position communicated to air traffic controllers during flight.

For a neophyte, the quantity of controls and display panels contained within the cockpit of an aircraft are daunting. Even experienced pilots/copilots must stay focused at any given moment in time during flight to access various controls within the cockpit and interpret information presented on various displays throughout the cockpit. As a result, pilots must continually scan a plurality of available displays for vital information at any particular moment in time during flight.

In recent years, flight management systems (FMS) have emerged, wherein some controls within the cockpit have been centralize into a single location within the cockpit, usually located next to the seat of the pilot. With a FMS, the pilot can tune various controls associated with displays located throughout the cockpit. Yet, the pilot may still be forced to access controls which are physically separated from the displays and multiple displays still exist within the cockpit. Additionally, the pilot often cannot look at both the controls and the displays at the same time.

In recent years, multifunction displays (MFDs) have been developed wherein a single display presents control data associated with a select few controls within the cockpit. However, not all of the controls are integrated into the bezel which surrounds the MFDs, nor are the controls in close proximity to the MFDs. Moreover, the MFDs are limited to presenting data related to only a few select controls within the cockpit. Correspondingly, the pilot still must manage a myriad of displays and controls located at various locations throughout the cockpit.

Furthermore, the Federal Aviation Association (FAA) has desired that some sensors have backup sensors and be further capable of having backup presentation of setting data on multiple displays within the cockpit in the event a primary sensor or display, presenting the setting data associated with the sensors, should fail during flight. Backup is especially important for communication sensors and navigational sensors, since these sensors vitally assist a pilot during flight. Generally, these sensors are set as radio frequencies by tuning controls, although in recent years GPS sensors provide additional navigational information. Furthermore, one or more channels are generally required for both communication and navigation within the aircraft during flight. These channels are recognized by those skilled in the art by the acronyms of COM1, COM2, NAV1, and NAV2. Moreover, these channels are associated with a variety of controls within the cockpit and can be used to provide redundancy desired by the FAA.

Yet, existing cockpit control systems and cockpit instrument panels do not provide seamless integration with respect to COM1, COM2, NAV1, and NAV2 controls. As a result, the pilot is forced to manually switch to alternate displays and controls in the event of a sensor or a display failure. Further, the pilot is often forced to view multiple displays to obtain all the relevant setting data associated with the sensors.

In fact, existing cockpit displays do not provide vital flight setting information data for timely access. Flight information data includes, by way of example only, COM1 settings, COM2 settings, NAV1 settings, NAV2 settings, autopilot settings, and other flight control settings (e.g., altitude settings, vertical speed settings, and the like). Correspondingly, a pilot often glances around the cockpit to view multiple displays during the flight in order to acquire all the requisite flight information data.

As is apparent to those skilled in the art, a pilot and copilot must remain alert and focused on controls and displays at critical points during the flight, such as takeoffs, landings, inclement weather, emergencies, or equipment malfunctions. Thus, pilots/copilots are required to have many hours of training to master the controls and displays within the cockpit before receiving the proper certification to fly an aircraft. This is especially true with larger commercial aircraft. Moreover as a result of the heightened mental acuity required during flight, many federal regulations also restrict the amount of time a pilot/copilot is permitted to fly in any given day in order to ensure the pilot/copilot remains alert during flight.

Therefore, there exists a need for better integrated cockpit displays and presentations of flight information within a cockpit, thereby permitting a pilot/copilot to acquire vital flight information data more rapidly and correspondingly better manage the controls related to the flight information data during flight.

SUMMARY OF THE INVENTION

The above-mentioned problems related to cockpit display systems and methods of presenting data on cockpit displays are addressed by the present invention and will be understood by reading and studying the following specification. Systems and methods are provided for cockpit display systems and cockpit data presented on cockpit displays, which are more efficient and integrated than current cockpit display systems.

The systems and methods of the present invention offer improved cockpit displays and provide for a more integrated presentation of flight settings associated with flight controls and flight sensors. Furthermore, the present invention offers improved access to the vital flight settings within the cockpit by presenting a plurality of settings together as a single data strip within a defined region of the cockpit display and making the data strip available at all times for the operator to view within the convenient, and readily accessible, defined region of the display.

In one embodiment of the present invention, a cockpit display is provided. The display includes a first region having communication settings and navigational settings simultaneously presented within the first region. The display further includes a second region having additional settings and graphical data simultaneously presented within the second region.

In still another embodiment of the present invention, a cockpit instrument system is provided. The system includes a display having an important display area where one or more important settings are presented. The display also includes an additional display area wherein one or more additional settings and graphical data are presented. Furthermore, the system includes a bezel encompassing the display and one or more controls affixed to the bezel operable to dynamically modify one or more of the important settings within the important display area and one or more of the additional settings within the additional display area.

In yet another embodiment of the present invention a method of presenting flight setting data on a flight display is provided, where a flight display is interfaced to flight controls and flight sensors. Moreover, flight setting data are received from the flight control sensors by adjusting the flight controls. Additionally, the flight setting data are presented in a contiguous location within the flight display, with one or more additional locations within the display available for additional use.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1:
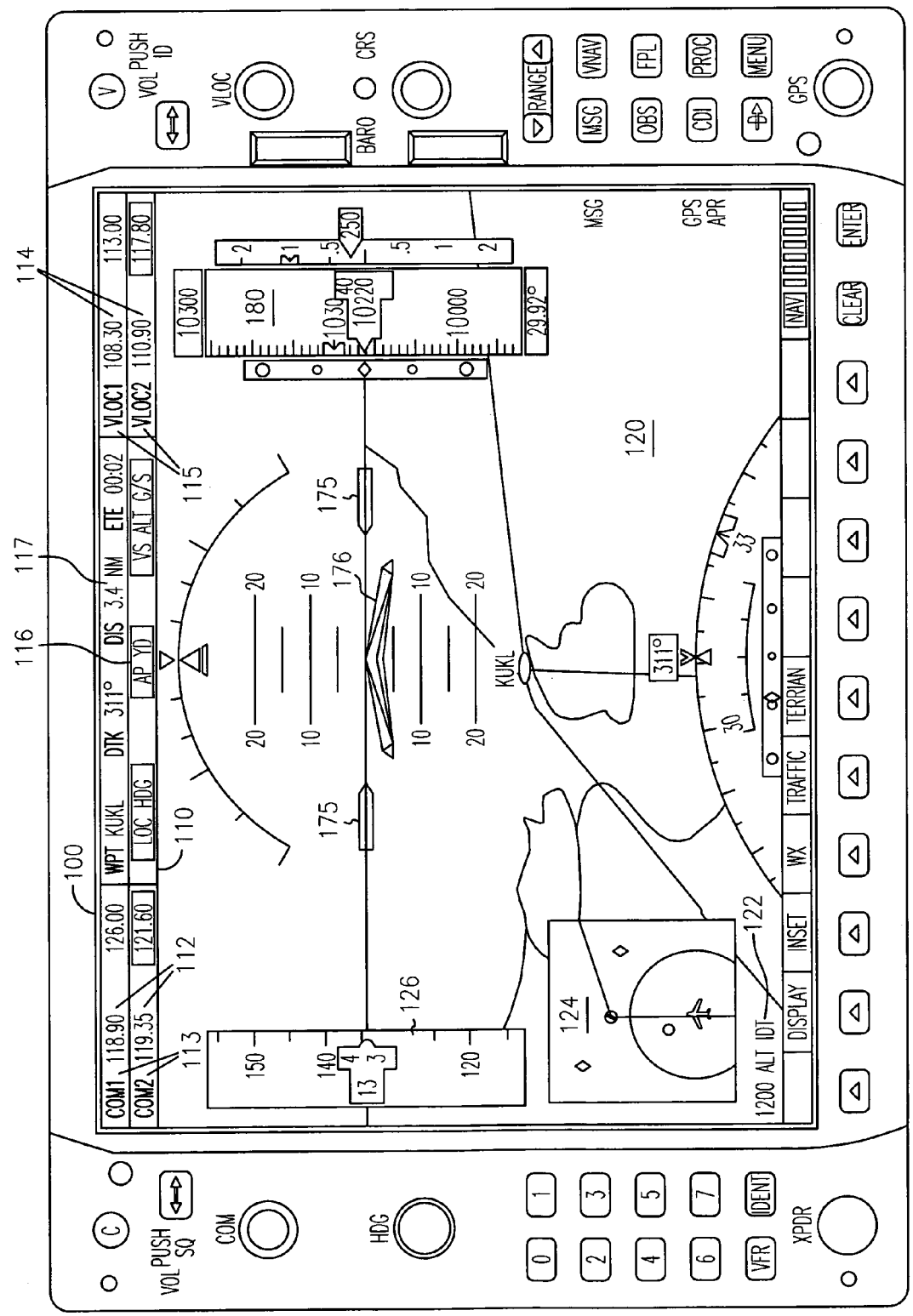
FIG. 1 is a cockpit display according to the teachings of the present invention.

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

In the present invention, improved multifunction displays (MFDs) are provided. As used herein, a MFD is used broadly to include graphical user interface based (GUI-based) displays with integrated presentation data presented thereon using a variety of views. The views are configured on the MFDs to provide ready access to flight information data. In some embodiments of the present invention the use of the term MFD is employed in connection with or to refer to a primary flight display (PFD). In some embodiments of the present invention the use of the term MFD is employed in connection with or to refer to a navigation display (NAV display). Additionally, in some embodiments, multiple MFDs are included such that a first MFD is principally used as a PFD and a second MFD is principally used as a NAV display. In such embodiments, the second MFD or NAV display is in compliment to the PFD. In the present invention, multiple MFDs can be stacked one upon the other, or alternatively arranged side by side. Further, in some embodiments an MFD is adapted to include audio capabilities. As one of ordinary skill in the art will appreciate upon reading this disclosure, the flight information data which is presented on such MFDs can differ based on the aircraft type, e.g. frame and engine type.

In the invention, a "bezel" is provided as part of the MFDs. Typically, the bezel is the framed perimeter that surrounds a display, but is not part of the display itself. Further as used in this application, control data and instrumentation data, including flight information data, refer to data received by controls coupled to input devices, such as communication and navigational input devices, and data received from various equipment and sensors, such as the aircraft engine, fuel, airspeed, altitude and attitude sensors. For example, navigational and communication controls tune navigational and communication devices (e.g., VLOC receivers, radios, and the like) within the aircraft and permit software operating on a processing device to receive and process the communication and navigational data collected by such devices. Equipment and sensor instrumentation facilitate the presentation of data relating to such parameters as aircraft engine, fuel, airspeed, altitude and attitude status.

In the present invention, this data can be operated on by software to generate one or more dynamic images on the GUI of a MFD display. As one of ordinary skill in the art will understand upon reading this disclosure, the display is capable of presenting text or graphical information. In some embodiments, the display provides image or video data. In one example, the GUI depicts a present movement, path and/or projected destination of an aircraft relative to locations on the ground along with airspeed, altitude, attitude and engine status data. As one skilled in the art will appreciate, input devices such as communication and navigation sensors include settings such as a current radio frequency, channel, and the like.

Although specific cockpit controls and particular flight information data are described herein, these descriptions are presented by way of example only and are not intended to limit the scope of the present invention. As one of ordinary skill in the art will understand upon reading this disclosure, any existing or customized controls and flight information data are readily integrated with one or more multifunction displays (MFDs) according to the teachings of the present invention. And, any combination and arrangement of the MFDs and the flight information data presented thereon are intended to fall within the scope of the present invention. According to the teachings of the present invention, flight information data is available at all times. As one of ordinary skill in the art will understand upon reading this disclosure, the MFDs are positioned within the cockpit so that a pilot can view and access communication and navigation controls proximately located to the MFDs at all times during flight.

According to the teachings of the present invention the PFD is a GUI-based display with integrated presentation data presented thereon using a variety of views, the views are configured on the PFD to provide the pilot with ready access to information desired and is available at all times as needed by the pilot. Further, the PFD is positioned within the cockpit so the pilot can view and access controls proximately located to the PFD at all times during flight.

Moreover, four control sensors that are typically associated with two or more controls are vitally important during flight, these four control sensors include two communication radio control sensors identified as COM1 and COM2. The remaining two control sensors assist in providing navigational data to various instruments located throughout the cockpit and are identified as NAV1 and NAV2. Although for purposes of illustration sensors and their associated controls are discussed as being associated with radio frequency data communication, as one skilled in the art will appreciate sensors, in some embodiments, are associated with satellite communication. Furthermore, in some embodiments, some sensors provide voice communications via a satellite, rather than via a radio frequency.

Also, terms and phrases: "flight settings," "flight setting data," "setting data," "settings," and "flight setting information" as used herein refer to the settings or readings associated with sensors necessary or useful during flight, such as settings associated with COM1, COM2, NAV1, NAV2, autopilot, altitude, air speed, destination distance, estimated time of arrival to a destination, and the like. The preceding terms are used interchangeably herein. Moreover, the flight settings include indications as to the current status of certain instruments, sensors, or devices of the aircraft (e.g., landing gear, flap settings, and the like).

Still further, settings include engine or sensor data such as, and by way of example only, engine parameter data identifying fuel flow, fuel quantity, oil pressure, manifold pressure, engine MAPs, engine RPMs. Also, settings include weather data, power setting data, traffic data, terrain data, or messaging data, wherein the setting data is streamed from an outside source to provide text information such as, and by way of example only, sport scores, news updates, stock quotes, weather reports, air controller messages, other pilot messages, and the like. Of course as one of ordinary skill in the art appreciates, due to the stringent requirements for aviation, in some embodiments, sport scores, news updates, stock quotes, and the like may not be desirable and may in fact create unwanted distractions for the pilot/copilot, but this data is not precluded with the teachings of the present invention.

FIG. 1 is cockpit display 100 according to the teachings of the present invention. The display 100 includes a first displayable region 110 and a second displayable region 120. The displayable regions, 110 and 120, visually identify, to an operator (e.g., pilot and/or copilot), text data, graphical data, and/or video data (if desired). As previously presented, the various forms of data displayed are derived or processed from the information provided by the communication and navigational sensors of an aircraft. Some of the information includes settings for the frequencies or channels associated with communication sensors (e.g., COM1 and COM2) or navigational sensors (NAV1 and NAV2). However, in some embodiments settings identify autopilot activation, transponder activation or transponder readings, other instrument activation or instrument readings, air speed readings, air pressure readings, altitude readings, destination information, and others.

In other embodiments the settings identify engine parameter data, weather related data, terrain data, traffic data associated with other aircraft in the vicinity, and messaging data (if desired). Again in some embodiments, messaging data includes text messages streamed across the first displayable region 110 or second displayable region 120. Message data includes text messages, email correspondences, broadcast messages, news data, sports data, financial data, weather forecast data, or any other controller pilot data link communications data (CPDLC). In still further embodiments, settings are video clips streamed to the first displayable region 110 or second displayable region 120. Further, in some embodiments since COM and NAV sensors provide communication and navigational information within the aircraft, all types of settings included herein are intended to fall within the definition of COM settings and/or NAV settings.

The display 100 of FIG. 1 includes, within the first region 110, a data strip of communication settings 112 and navigational settings 114. And, in some embodiments, the data strip of the first region 110 also includes an auto pilot activation indication, such as AP 116, and additional flight information, such as DIS 117. In the embodiment shown in FIG. 1, DIS 117 indicates that the distance in nautical miles (NM) to the destination is 3.4 NM. Furthermore, in some embodiments the data strip housed within the first region 110 is presented horizontally across the vertical most position of the display 100, wherein the first region 110 is positioned above the second region 120. However, the invention is not so limited and one of ordinary skill in the art will appreciate that a number of other suitable locations, as desired for any particular implementation, are also considered within the scope of the present invention.

In some embodiments, the communication settings 112 include communication text labels COM1 and COM2 113 and the navigational settings 114 include navigational text labels VLOC1 and VLOC2 115. As one skilled in the art will appreciate, the labels (e.g., 113 and 115) permit rapid recognition and identification of the communication settings 112 and the navigational settings 114, within the data strip of the first region 110 of the display 100. In this way, a pilot/copilot looks to one central location (e.g., the first region 110) within the display 100 to access all the needed flight settings during flight. This improves the pilot's/copilot's efficiency and mitigates against possible pilot/copilot error, since the pilot/copilot need not visually scan several displays, or several locations within the cockpit, to acquire important flight settings. Thus, in the present invention the pilot/copilot can quickly reference this information when necessary, which allows the pilot/copilot to expend more energy and effort focusing on other vital tasks during flight.

Of course in some embodiments, setting data within a first displayable region 110 is presented on displays which are made available to the airline passengers, if desirable to do so. In this way, passengers view setting data on passenger provided displays, as defined by a configuration set by a pilot/copilot, the setting data is viewed and as a data strip within a first displayable region 110. The displays used by the passengers can be, if desired, synchronized to the pilot's displays or controlled by the pilot to display only informational settings as the pilot deems acceptable such as, and by way of example only, air speed, outside air temperature, altitude, distance to destination, and the like. In this way, passengers viewing a flight channel, on any airline provided passenger display, view settings as a data strip, in a first displayable region 110 according to the teachings of the present invention. In other embodiments, passengers configure the data strip and the first displayable region 110 to be presented on other flight channels of any airline provided display such as, and by way of example only, a channel providing in-flight movies, television programing, and the like.

The second region 120 of the display 100 is operable to present additional settings such as additional setting 122 (e.g., transponder mode and squawk codes represented as the string "1200 ALT IDT" in FIG. 1) and graphical data, such as inset view 124 and instrument view 126. Of course any setting data which is not depicted within the first displayable region 110, in some embodiments, is also configured to be presented within the second displayable region 120. Further, settings which are displayed in the first region 110, in some embodiments, are repeated and redundantly displayed within the second region. In this way, no limitation exists as to the content of what is displayed within the second region 120 of the present invention, and the settings or graphical data are entirely customizable.

The first region 110 and the second region 120 are simultaneously presented on the display 100 during flight. Further the data presented, within the regions (e.g., 110 and 120), are dynamically adjusted and can deliver to the pilot/user realtime data during flight. Additionally, the additional settings are dynamically configurable. In this manner a pilot/user can modify and adjust the setting data presented on display 100. Settings are also dynamically modified or configured automatically by one or more of the communication or navigational devices during flight.

As one skilled in the art will appreciate, the precise layout of display 100 in FIG. 1 is presented for purposes of illustration only, and any configuration of the first region 110 with respect to the second region 120 within the display 100 is intended to fall within the scope of the present invention.

Figure 2:
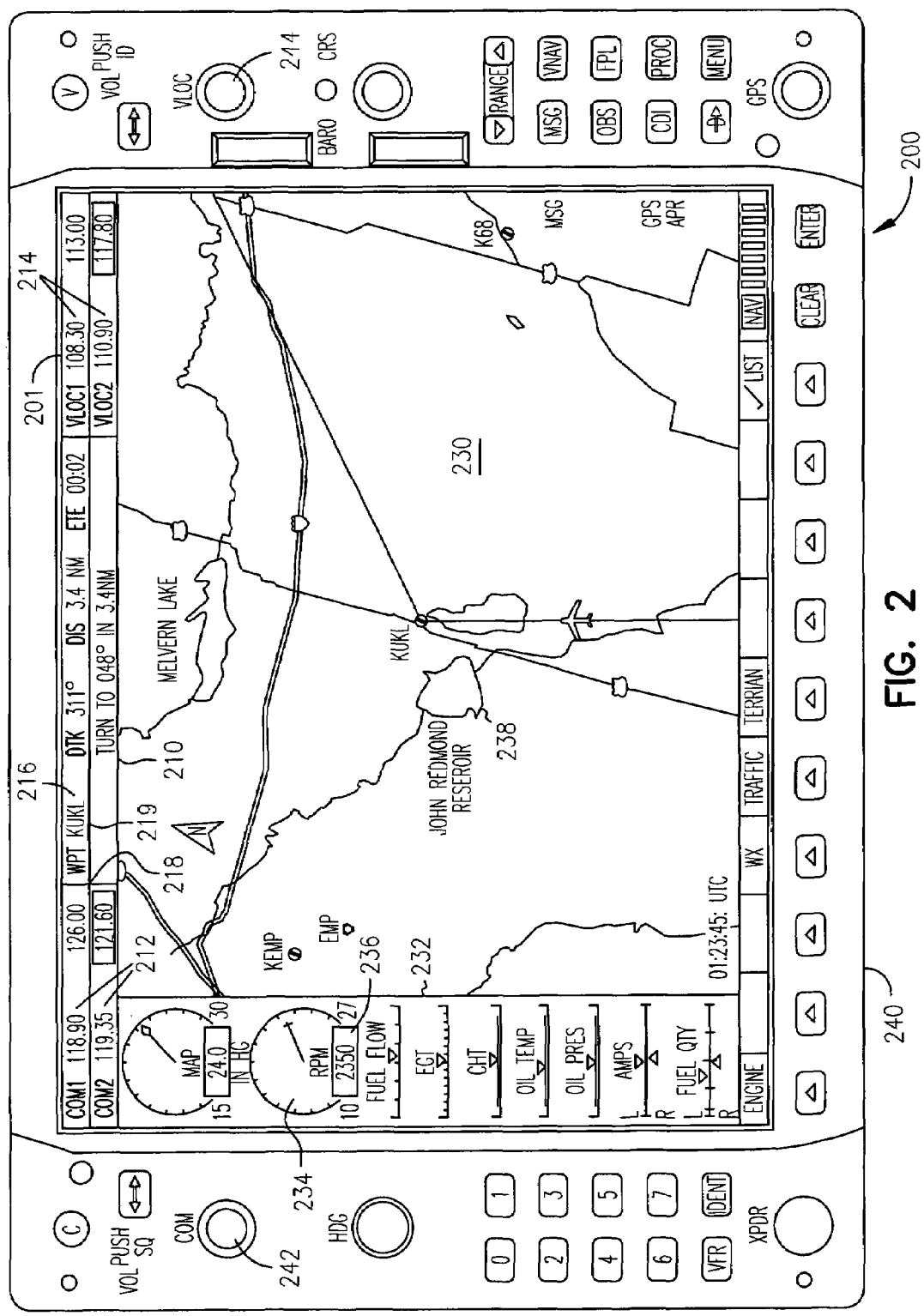
FIG. 2 is another cockpit display according to the teachings of the present invention.

FIG. 2 is cockpit display system 200 according to the teachings of the present invention. The system 200 includes a display 201 having a flight setting display area 210 and an additional display area 230. The flight setting display area 210 further presents settings which include auto pilot settings, messaging settings, engine parameter readings, weather readings, terrain readings, traffic readings, or any other flight settings. The system 200 also includes a bezel 240 and one or more controls 242 and 244 affixed to the bezel 240.

As shown in the embodiment of FIG. 2, the flight setting display area 210 presents one or more important settings (e.g., COM1 and COM2 212, and VLOC1 and VLOC2 214). In some embodiments the important settings include autopilot settings, or other flight information, such as for example the text "KUKL" 216 which indicates a specific destination airport (e.g., way point) for the aircraft. In other embodiments the flight setting display area 210 is positioned directly above the additional display area 230. In still other embodiments, the flight setting display area 210 is configured to the desirability of a user, such that an orientation of the flight setting display area 210 with respect to the additional display area 230 is customizable.

In some embodiments according to the teachings of the present invention, one or more of the important settings (e.g., 212, 214, and 216) are presented within the flight setting display area 210 as distinct colors, thereby directing a pilot's/copilot's attention to a specific setting when the specific setting is uniquely desired by the pilot/copilot. For example in some embodiments, COM1 and COM2 settings 212 appear in a green color within the flight setting display area 210 of display 201, while the destination airport text "KUKL" 216 appears in a magenta color. Of course as previously presented, the distinct colors facilitate directing any user's (e.g., passenger or air traffic controller) attention to a uniquely desired setting, and correspondingly the present invention is not intended to be constrained to uses of the present invention by a pilot/copilot alone. Also, one of ordinary skill in the art will appreciate that myriads of such color designations are to be included within the scope of the present invention.

In fact, a variety of visible delineations within the flight setting display area 210 are used in some embodiments to further assist the pilot/user in rapidly identifying and acquiring any desired setting within the flight setting display area 210. For example, vertical and/or horizontal lines 218 are drawn, in some embodiments, to delineate logically different important settings (e.g., 212, 214, and 216). Of course as one skilled in the art will appreciate, delineations need not be made by unique colors, vertical or horizontal lines, since any visual cue directed to uniquely distinguishing specific important settings (e.g., 212, 214, and 216) within the flight setting display area 210 is intended to fall within the scope of the present invention such as and by way of example only, settings which flash or blink, or which are presented with any other visual effects.

As shown in FIG. 2, flight setting display area 210 is but one portion of display 201. That is, the additional display area 230 presents additional settings (e.g., 236) and graphical data (e.g., 238). Moreover, in some embodiments the additional display area 230 is further subdivided into one or more sub-additional display areas, such as equipment parameter display area 232 of FIG. 2. Each of the one or more sub-additional display areas (e.g., 232) includes sub-settings, such as the RPM reading 236 and sub-graphical data, such as the RPM instrument image 234. In this way, the display 201 is further organized and efficiently segmented to provide the pilot/copilot with more information, and the information occupies less space within the cockpit by being presented on a single display 201. Moreover, access to desired information is more rapidly obtained since the information is better integrated and identified with visual cues. As one skilled in the art will appreciate, the system 200 of FIG. 2 provides more useful information in a more timely fashion than what has been provided in the past, this allows the pilot/copilot to focus on more intellectually challenging tasks as need during flight.

As mentioned above, the bezel 240 which encompasses the display 201 includes controls 242 and 244 which when operated by the pilot/copilot will modify one or more of the important settings (e.g., 212, 214, or 216) within the display 201. This provides further integration and ease of use, since as the important settings (e.g., 212, 214, and 216) are adjusted, the pilot's/copilot's hand is in close proximity to where the important display area 210 is located, and the pilot/copilot can in realtime visually identify the adjustments being made on the display 201.

Figure 3:
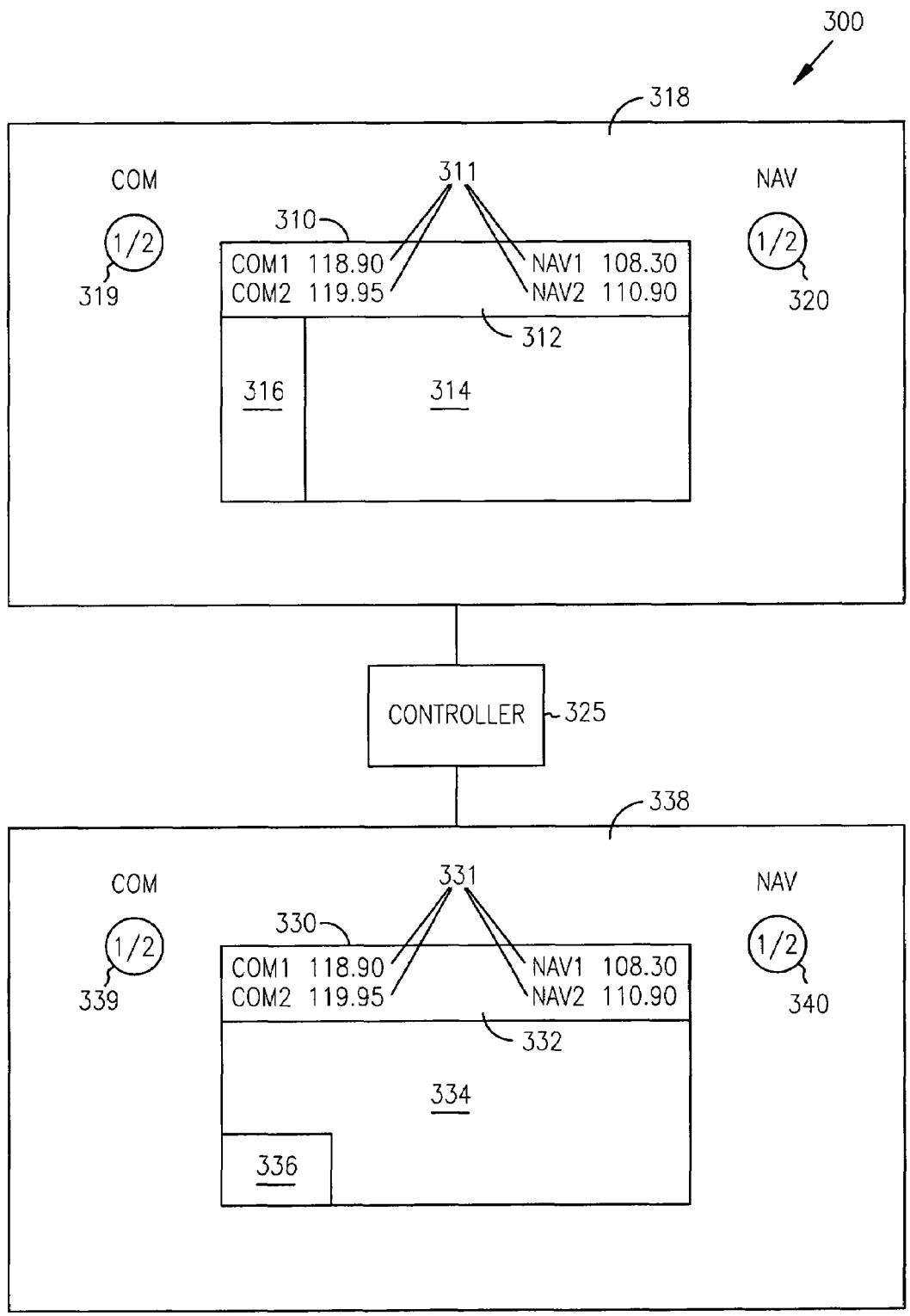
FIG. 3 is a cockpit display system according to the teachings of the present invention.

FIG. 3 is another cockpit display system 300 according to the teachings of the present invention. Display system 300 includes a first display 310 having a first region 312 and one or more second regions 314 and 316. Further, display system 300 includes a second display 330 having a first region 332 and one or more second regions 334 and 336. The first region 312 of the first display 310 displays certain flight settings 311 in conjunction with additional settings and additional flight data within the one or more second regions 314 and 316 of the first display 310. Moreover, the first region 332 of the second display 330 displays certain flight settings 331 in conjunction with additional settings and additional flight data within the one or more regions 334 and 336 of the second display 330.

Additionally in some embodiments, the display system 300 includes a first bezel 318 which encompasses the first display 310 and includes one or more flight controls 319 and 320 affixed thereto. Furthermore, the display system 300 has a second bezel 338 which encompasses the second display 330 and includes one or more flight controls 339 and 340 affixed thereto. As is appreciated by one of ordinary skill in the art, the bezels 318 and 338 need not entirely encompass their respective displays 310 and 330. In fact in some embodiments a single bezel is shared between the two displays 310 and 330 and proximately located between the two displays 310 and 330. Of course any configuration of one or more bezels proximately located to two or more displays is intended to fall within the scope of the present invention.

In some embodiments, a controller 325 interfaces the flight sensors associated with the flight settings 311 and 331, such that flight settings 311 of the first region 312 within the first display 310 are identical to the flight settings 331 of the first region 332 within the second display 330. The controller 325, in some embodiments, is a set of executable instructions and in other embodiments is a set of electro-mechanical devices operable to interface the flight sensors associated with the flight settings 311 and 331, the additional settings, and the additional flight data. Moreover in some embodiments, the controls (e.g., 319, 320, 339, and 340) work in concert with one another through the controller 325 to ensure that as flight settings are adjusted on one display, the adjustments dynamically appear on the other display.

Further in other embodiments, the flight settings 311 and 331 are displayed within the first regions 312 and 332 of the displays 310 and 330 at a vertical most location. Alternatively, the flight settings 311 and 331 are displayed within each of the displays 310 and 330 horizontally across the first regions 312 and 332. As one of ordinary skill in the art will understand upon reading the present disclosure, in some embodiments, the first display 310 and the second display 330 are adjacent or in close proximity to one another. Moreover, all embodiments which conveniently and contiguously display the flight settings 311 and 331 within regions 312 and 332 are intended to fall within the scope of the present invention.

Figure 4:
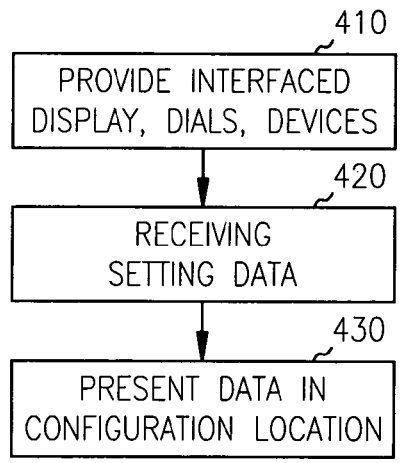
FIG. 4 is a flow diagram of a method to present data on a cockpit display according to the teachings of the present invention.

FIG. 4 is one flow diagram of one method 400 to present data on a cockpit display according to the teachings of the present invention. An integrated cockpit display system is provided in block 410. The integrated display system includes a display which is encompassed by a bezel, affixed to or proximately located on the bezel are one or more controls, the controls are used to adjust flight sensors which are affixed to or proximately located behind the bezel or the display. In some embodiments, the sensors are affixed to or proximately located behind both the bezel and the display. In this way the controls and the sensors are interfaced with the display.

As the controls are adjusted, setting data associated with the sensors are modified and received in block 420. As previously presented, setting data includes NAV settings, COM settings, destination settings, weather readings, equipment readings, terrain readings, traffic readings, messaging data, and the like. Moreover in some embodiments, adjustment to the controls are achieved by depressing the controls, turning the controls clockwise or counter clockwise, interfacing other portable electronic devices to the controls/sensors, or audibly communicating with the controls/sensors when the controls are equipped to receive audible input.

In block 430, the setting data are presented in a contiguous location within the display, while the display also includes additional locations which are available for additional use at the same time that the setting data are presented in the contiguous location. In some embodiments, the contiguous location is a data strip presented around the perimeter of the display, for example along the top of the display. In other embodiments, the contiguous location appears across the middle of the display. In still other embodiments, the exact location of the contiguous location is configurable by the pilot/copilot of method 400. In yet other embodiments, the content of the setting data is configurable by the pilot/copilot of method 400.

It is readily apparent, that the method 400 provides setting data in an integrated fashion combined with displays, controls, sensors and bezels. This reduces equipment space requirements within a cockpit, provides improved pilot/copilot access, and focuses a pilot's/copilot's attention to specific desired information contained within the setting data. As is also apparent, this provides an improved ergonomic experience for the pilot/copilot of method 400.

Figure 5:
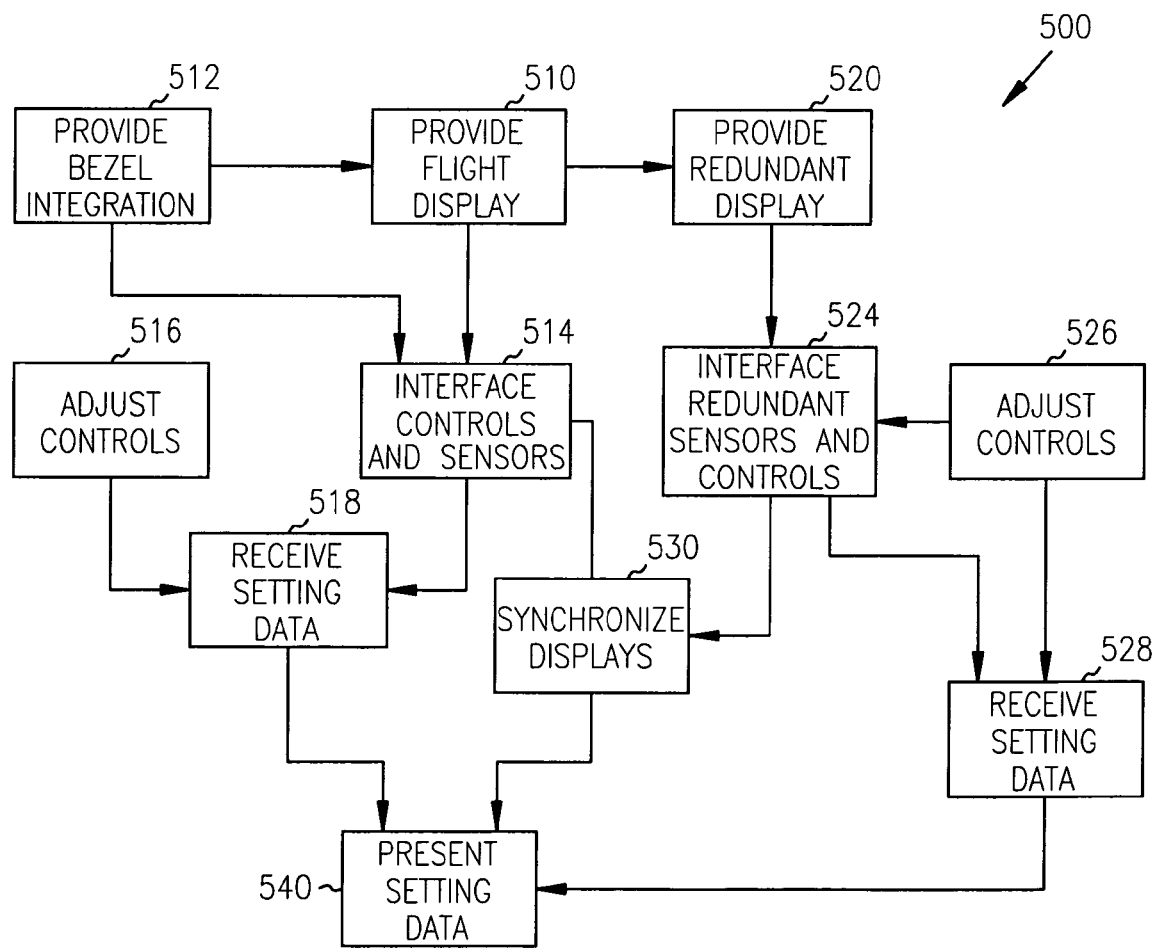
FIG. 5 is a flow diagram of another method to present data on a cockpit display according to the teachings of the present invention.

FIG. 5 is one flow diagram of another method 500 to present data on a cockpit display according to the teachings of the present invention. Initially in block 510, a flight display is provided wherein the display is interfaced to flight controls in block 514. The flight controls are coupled and in communication with flight sensors. As the flight controls are adjusted in block 516 flight setting data are received in block 518.

Once flight setting data are received, the setting data are presented in a contiguous location within the flight display in block 540. Further, the flight display includes one or more additional locations within the display which remain available for use to display other types of data. In this way, flight setting data are consistently presented within the flight display at a contiguous location for ease of access, identification, and consumption by a user of method 500.

Furthermore in some embodiments, a bezel is provided in block 512 with the flight display such that the bezel encompasses the display and includes flight controls affixed to the front side of the bezel, with the rear side of the bezel or the rear side of the display including sensors associated with the flight sensors. In still other embodiments, a redundant flight display is provided in block 520 and is proximately located to the flight display. The redundant flight display includes another bezel surrounding the redundant flight display along with redundant flight controls and redundant flight sensors.

In block 524, the redundant flight controls and redundant flight sensors are interfaced with the redundant flight display as the redundant flight controls are adjusted in block 526. Moreover, flight setting data are received in block 528 and synchronized with each flight display to a contiguous location within each flight display in block 530. The flight setting data are then simultaneously presented within each flight display in block 540.

Of course as is readily apparent to those skilled in the art, a variety of configurations of the flight sensors and redundant flight sensors are possible without departing from the present invention. For example, the flight sensor and the redundant flight sensor, in some embodiments, are proximately located behind the flight display and/or a bezel encompassing the flight display. In other embodiments, the flight sensor and the redundant flight control sensor are proximately located behind the redundant flight display and/or a redundant bezel encompassing the redundant flight display.

Moreover, although method 500 is depicted as initially beginning with block 510, it will be appreciated by one of ordinary skill in the art that the order of the processing depicted in method 500 can occur in any sequence. Accordingly, the method 500 should not be read so as to import a specific sequence of steps with respect to the individual blocks of method 500.

As one of ordinary skill in the art will understand upon reading this disclosure, the methods of the present invention can be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally deactivated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, cause the processor to perform the respective method. In other embodiments, methods provided above are implemented as a set of instructions contained on a computer-accessible medium capable of directing a processor to perform the respective method. In varying embodiments, the medium includes a magnetic medium, an electronic medium, or an optical medium.

CONCLUSION

The above cockpit display systems and methods for presenting data on cockpit displays have been described, by way of example and not by way of limitation, with respect to improving the efficiency and the format in which flight information data is presented. That is, the display systems, and methods provide for better integrated access and presentation of flight settings during operation of an aircraft. Flight settings of multiple types are integrated and placed into a single data strip, which is consistently presented within a single region of cockpit displays for the present invention, thereby providing improved flight safety by reducing delay and distraction in locating and referencing flight information data. In turn, this reduces the potential of pilot/copilot error in accurately interpreting flight settings. Moreover, the integration and presentation of the flight settings provide for quick and easy reference in the present invention allowing the pilot/copilot or any user to direct more energy and resources to other tasks during flight, since the settings are obtained and accessed easily at any point during the flight from a single region within a display.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A cockpit display, comprising:
   a first region having communication settings and navigational settings simultaneously presented within the first region; and
   a second region having additional settings and graphical data simultaneously presented within the second region, wherein the cockpit display is surrounded by a bezel having avionic communication, navigation, and transponder controls integrated within the bezel, and wherein the controls are manually adjusted to modify the settings and the graphical data.

2. The display of claim 1, wherein the first region further includes auto pilot settings and flight control settings which are simultaneously presented within the first region.

3. The display of claim 1, wherein the settings of the first region are presented horizontally across the display.

4. The display of claim 1, wherein the first region is positioned above the second region within the display.

5. The display of claim 1, wherein the communication settings are presented within the first region with one or more communication labels identifying the communication settings.

6. The display of claim 1, wherein the navigational settings are presented within the first region with one or more navigational labels identifying the navigational settings.

7. A cockpit display system, comprising:
a display having a display area where one or more settings are presented, and the display further includes an additional display area wherein one or more additional settings and graphical data are presented;
a bezel surrounding a perimeter of the display; and
one or more controls integrated within the bezel operable to dynamically modify one or more of the settings within the display area and one or more of the additional settings within the additional display area, and an avionic transponder control integrated into the bezel.

8. The system of claim 7, wherein the setting display area is positioned directly above the additional display area within the display.

9. The system of claim 7, wherein an orientation of the display area with respect to the additional display area within the display is configurable.

10. The system of claim 7, wherein the settings include communication settings, navigational settings, and flight control settings.

11. The system of claim 7, wherein each of one or more of the settings are presented on the display as a separate distinct color.

12. The system of claim 7, wherein the additional display area is further subdivided into one or more sub-additional display areas and wherein each sub-additional area includes sub-settings and graphical data.

13. The system of claim 7, wherein the setting display area and the additional display area are visibly delineated within the display with one or more visual cues.

14. A cockpit instrument system, comprising: a first display having a first region displaying settings and one or more second regions displaying first additional settings and additional flight data;
a second display having a first region displaying the settings and having one or more second regions displaying second additional settings and the additional flight data,
and wherein the first and second displays immediately adjacent to one another; and wherein the first additional settings and the second additional settings are the same;
a first bezel encompassing the first display and having one or more controls affixed to the first bezel; and a second bezel encompassing the second display and having one or more controls affixed to the second bezel;
wherein the controls are manually adjusted to modify the settings and displayed flight data.

15. The system of claim 14, wherein the settings include communication settings, navigational settings, destination settings, engine readings, messaging data, weather readings, terrain readings, traffic readings, transponder settings, and autopilot settings.

16. The system of claim 14, wherein the settings are displayed at a vertical most location within the first display and at a vertical most location within the second display.

17. The system of claim 14, wherein the settings are displayed horizontally across the first region of the first display and the first region of the second display.

18. The system of claim 14, wherein the first display and the second display are adjacent to one another.

19. The system of claim 14, wherein if the settings are modified the first and second displays are dynamically adapted to display the modified settings in concert with one another.

20. A method of presenting flight setting data on a flight display, comprising:
providing a flight display interfaced to flight controls and flight sensors, and wherein the flight controls include a transponder control;
receiving flight setting data from the flight sensors by manually adjusting the flight controls; and
presenting the flight setting data in a contiguous location within the flight display with one or more additional locations within the display available for additional use;
wherein in providing the flight display, a bezel encompasses the flight display having the flight controls affixed to a front side of the bezel, and a rear side of the display and the bezel include the flight sensors.

21. The method of claim 20, wherein in receiving the flight setting data, the flight setting data include navigational settings and communication settings.

22. The method of claim 20, wherein in receiving the flight setting data, the flight setting data include at least one of autopilot settings, destination settings, messaging data, weather readings, terrain readings, traffic readings, transponder settings, and equipment readings.

23. The method of claim 20, further comprising:
providing a redundant flight display proximately located by the flight display, and providing redundant flight controls, and redundant flight sensors proximate thereto; and
presenting the flight setting data in a contiguous location within the redundant flight display in a same presentation format as presented in the flight display.

* * * * *